United States Patent [19]

Mahoney

[11] Patent Number: 5,563,991
[45] Date of Patent: Oct. 8, 1996

[54] USING AN IMAGE SHOWING A PERIMETER RELATIONSHIP REPRESENTATION TO OBTAIN DATA INDICATING A RELATIONSHIP AMONG DISTINCTIONS

[75] Inventor: James V. Mahoney, San Francisco, Calif.

[73] Assignee: Xerox Corporation, Stamford, Conn.

[21] Appl. No.: 157,790

[22] Filed: Nov. 24, 1993

[51] Int. Cl.$^6$ .................................................. G06T 7/00
[52] U.S. Cl. ................................. 395/133; 395/135
[58] Field of Search .................................. 395/133–136, 395/140, 141, 145, 147, 155–161, 600, 650

[56] References Cited

U.S. PATENT DOCUMENTS

| | | | |
|---|---|---|---|
| 5,086,495 | 2/1992 | Gray et al. | 395/124 |
| 5,231,676 | 7/1993 | Mahoney | 382/22 |
| 5,355,473 | 10/1994 | Au | 395/600 |
| 5,392,130 | 2/1995 | Mahoney | 358/400 |
| 5,404,439 | 4/1995 | Moran et al. | 395/155 |
| 5,418,950 | 5/1995 | Li et al. | 395/600 |
| 5,455,898 | 10/1995 | Mahoney et al. | 395/133 |
| 5,465,167 | 11/1995 | Cooper et al. | 358/468 |
| 5,513,271 | 4/1996 | Rao et al. | 382/113 |
| 5,515,488 | 5/1996 | Hoppe et al. | 395/140 |

OTHER PUBLICATIONS

Spoerri "Infocrystal: A Visual Tool For Information Retrieval" IEEE (1993).

Helm, R. Marriott, K., Odersky, M., "Building Visual Language Parsers," in Proceedings of CHI, 1991 (New Orleans, Louisiana, Apr. 29–May 2, 1991), ACM, New York, 1991, pp. 105–112.

Ricoh Imagio MF530 Series General Catalog, Ricoh K. K., 1992, with English translation of cover page and pp. 1–2 and 23–24.

The Apple Catalog, Fall 1993, pp. 1 and 4–5.

*Primary Examiner*—Almis R. Jankus

[57] ABSTRACT

Input image data define an input image that shows a perimeter relationship representation, such as a Venn diagram or statechart. The representation includes a perimeters feature that satisfies a constraint on perimeters. The constraint can include a perimeter size criterion that distinguishes perimeters from labels. Or the constraint can include an enclosing perimeter criterion requiring a connected component within each perimeter and a perimeter label criterion requiring a label for each perimeter. The constraint can also include an empty perimeter criterion to distinguish empty perimeters from labels. The input image data are used to obtain perimeters data indicating parts of the input image that satisfy the constraint. The perimeters data are used to obtain relationship data indicating a relationship between distinctions represented by the perimeters. The relationship data can be used to obtain output image data defining an output image that includes precisely formed version of the representation or another graphical representation of the relationship, such as a table. The table can include a set label at the head of each row and an element label at the head of each column, with a bullet in a space in a row and column if the row's set includes the column's element.

22 Claims, 12 Drawing Sheets

USING AN IMAGE SHOWING A PERIMETER RELATIONSHIP REPRESENTATION TO OBTAIN DATA INDICATING A RELATIONSHIP AMONG DISTINCTIONS

BACKGROUND OF THE INVENTION

The present invention relates to techniques for analyzing an image showing a graphical representation.

Helm, R., Marriott, K., Odersky, M., "Building Visual Language Parsers," in proceedings of CHI, 1991 (New Orleans, La., Apr. 28–May 2, 1991), ACM, New York, 1991, pp. 105–112, describe visual language parsers that take as input a set of hand-written gestures recognized by underlying software. A parser combines the gestures into higher-level pictures that are combined in turn until the whole diagram is represented by a single data structure, as illustrated in FIG. 1. Page 106 describes visual languages in which topological relationships use containment, intersection, and touch to relate elements in a diagram. Visual languages based on topological relationships include Venn diagrams and window layout diagrams. Page 107 describes statecharts, illustrated in FIG. 2, that use topological relationships to capture states and their substates. The diagram in the right column on page 107 can be parsed to produce an append program in Visual Prolog, which uses topological relationships, such as "inside" and "touching." Use of constrained set grammars to extract a diagram's meaning is described at pages 108–110. Constraints enable information about spatial layout and relationships to be naturally encoded in the grammar. A topological constraint, a minimization constraint, existential quantification, defining high-level constraints in terms of more primitive constraints, and a negative constraint are described at pages 109–110.

SUMMARY OF THE INVENTION

The invention is based on the recognition of a basic problem in analyzing an image showing a perimeter relationship representation such as a Venn or set membership diagram, an isometric map, a statechart, or another graphical representation in which a feature defines perimeters. In a perimeter relationship representation, each perimeter represents a distinction between items that fall within a set or category and items that fall outside the set or category, and perimeters enclose areas in a way that indicates a relationship among distinctions they represent. For example, if a perimeter representing a first set completely encloses a perimeter representing a second set, the second set is a subset of the first; if the two perimeters are separate, with neither enclosing the other and with no crossings, the first and second sets are mutually exclusive; and if the two perimeters cross so that both enclose a shared area and each encloses some non-shared area, the first and second sets have a shared subset, or an intersection.

Perimeter relationship representations typically include labels. In a Venn diagram, for example, each perimeter may be labeled with a set label, and elements in a set may also be labeled with the set's perimeter. But labels and perimeters may be ambiguous. Therefore, analysis of an image showing a perimeter relationship representation often requires resolution of ambiguity. Ambiguity limits the usefulness of perimeter relationship representations for communicating information to a machine.

The invention is based on the discovery of an image analysis technique that alleviates the problem of ambiguity in perimeter relationship representations. The technique analyzes an image that shows a perimeter relationship representation to obtain information about a relationship among the distinctions represented by the perimeters. The image includes a perimeters feature that satisfies a constraint on perimeters. Because the perimeters feature satisfies the constraint, the image set can be analyzed to obtain accurate information about the relationship among the distinctions.

The technique obtains input image data defining an input image showing a perimeter relationship representation with a perimeters feature as described above. The technique uses the input image data to obtain perimeters data indicating parts of the input image that satisfy the constraint on perimeters. The indicated parts of the input image therefore enclose the same areas that the perimeters feature encloses. The technique then uses the perimeters data to obtain relationship data indicating a relationship among the distinctions.

The constraint on perimeters can include a perimeter size criterion to distinguish labels from perimeters. The perimeter size criterion can require a connected component that encloses areas that together are greater than a certain multiple of the area of the connected component.

The constraint on perimeters can alternatively include a set of criteria that relate to perimeter-label relationships. The constraint on perimeters can include an enclosing perimeter criterion requiring a connected component that encloses an area containing one or more other connected components. The constraint on perimeters can also include a perimeter label criterion requiring, for each perimeter, a nearest connected component outside the perimeter that does not meet the perimeter criterion and that is nearer to the perimeter than to any other perimeter. If a part of the input image meets the perimeter criterion and also has a nearest connected component with which it meets the perimeter label criterion, the part satisfies the constraint on perimeters.

The enclosing perimeter criterion and the perimeter label criterion solve the ambiguity problem, but the requirement that every perimeter contain another connected component is inconvenient because perimeter relationship representations often include an empty perimeter, either because its contents are not specified or because it has no contents. To solve this problem, the constraint on perimeters can include an empty perimeter criterion that is an alternative to the enclosing perimeter criterion and that distinguishes empty perimeters from labels. The empty perimeter criterion can, for example, require inner and outer closed curves, such as circles, with the area between the closed curves required to be less than a certain proportion of the area enclosed by the inner curve.

The technique can use perimeters data to obtain data indicating relationships among distinctions by obtaining, for each part that satisfies the perimeters constraint, contents data indicating contents of areas it encloses. If each perimeter has a perimeter label outside it and there is at least one item label in each distinct enclosed area, the relationship data can simply indicate, for each perimeter label, whether it includes each item label. Or, each distinct enclosed area could have a unique identifier, and the relationship data could indicate, for each distinct enclosed area, the labels of perimeters that enclose it and any item labels it encloses.

The relationship data can include a list of sublists, with each sublist including a set identifier identifying a set and a list of item identifiers identifying items within the set. If the input image shows perimeter labels for perimeters and item labels within perimeters, the set identifiers can include, for each set represented by a perimeter with a perimeter label, data defining the perimeter label; the item identifiers can include, for each item with an item label, data defining the item label.

The technique can store the relationship data or use it somehow. For example, the technique can use the relationship data to provide control signals to a system. Or the technique can use the relationship data to obtain data defining an image showing a precisely formed version of the perimeter relationship representation or another representation of the relationship among distinctions, such as a table. The table can include perimeter labels and item labels, indicating for each item label whether it is in the area enclosed by the perimeter indicated by each perimeter label.

The technique can be implemented with a machine that includes image input circuitry and data indicating image processing instructions. The image input circuitry can receive data defining an image set that shows a perimeter relationship representation with a perimeters feature that satisfies a constraint on perimeters. The machine's processor can execute the image processing instructions. In executing the image processing instructions, the processor can receive the input image data from the image input circuitry and use the input image data to obtain perimeters data indicating parts of the input image that satisfy the constraint on perimeters. The processor can then use the perimeters data to obtain relationship data indicating a relationship among distinctions. The machine can be a highspeed image processing server that responds to image processing requests from a network to which it is connected.

The machine can also include image output circuitry, and the processor can use the relationship data to obtain output image data defining an output image that shows a representation of the relationships. The machine can be a fax server or a copier.

The technique can also be implemented in a software product that includes a storage medium and data stored by the storage medium. The software product can be used in a machine that includes image input circuitry. The data stored by the storage medium can include image processing instructions the machine's processor can execute. In executing the image processing instructions, the processor can receive input image data from the image input circuitry defining an input image that shows a perimeter relationship representation with a perimeters feature that satisfies a constraint on perimeters. The processor can use the input image data to obtain perimeters data indicating parts of the input image that satisfy the constraint on perimeters. The processor can then use the perimeters data to obtain relationship data indicating a relationship among distinctions.

The technique described above is advantageous because it makes it possible to automatically analyze a variety of perimeter relationship representations. In addition to Venn diagrams, the technique is applicable to various representations in which the perimeters are typically nested rectangles, including some organization charts and representations of block-structured programs. The relationship data obtained by the technique can be used to produce an image showing a representation of the relationships in response to a simple sketch by a user.

The following description, the drawings, and the claims further set forth these and other aspects, objects, features, and advantages of the invention.

DETAILED DESCRIPTION

A. Conceptual Framework

Figure 1:
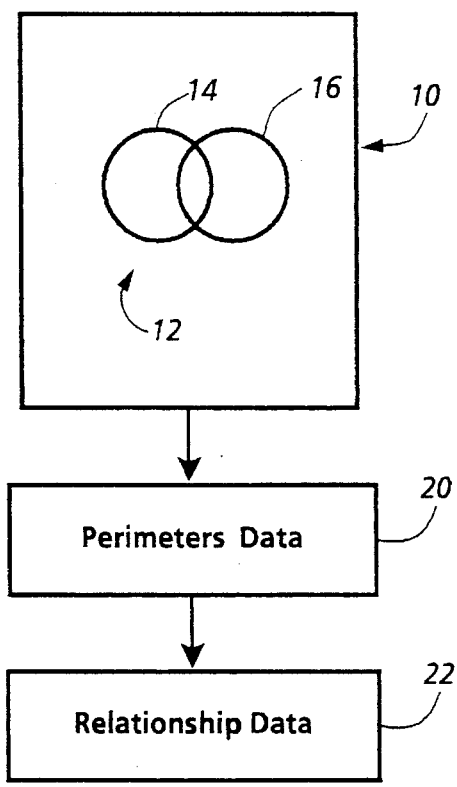
FIG. 1 is a schematic diagram illustrating how an image showing a perimeter relationship representation can be analyzed.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A "control signal" is a signal provided to a machine or other system that can cause a change in the system's state, such as by changing the way in which the system operates. In executing a set of instructions, a processor may, for example, provide control signals to internal components within the processor and to external components connected to the processor, such as input/output devices.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data. An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature. An image set "shows" a feature when the image set includes one or more images that, separately or in combination, show the feature. An item of data "defines" a feature when the item defines an image set that shows the feature.

A "graphical representation" is a graphical feature that includes elements that are spatially related in a configuration that represents information.

An image may be divided into "segments," each of which is itself an image. A segment of an image may be of any size up to and including the whole image.

An image or image set may be analyzed into "parts," each of which is smaller than the whole image or image set. Each part includes one or more segments of the image or segments of images in the image set.

An item of data "defines" an image when the item of data includes sufficient information to produce the image. For example, a two-dimensional array can define all or any part of an image, with each item of data in the array providing a value indicating the color of a respective location of the image.

A "data image" is an item of data defining an image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

A "human-produced image" is an image that shows marks made by hand by a human, by a machine under control of a human, or in some other way in which a human can provide marks.

The term "mark" includes a single mark and also plural marks that together form a pattern of marks.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

A "version" of a first image is a second image produced using an item of data defining the first image. The second image may be identical to the first image, or it may be modified by loss of resolution, by changing the data defining the first image, or by other processes that result in a modified version.

Each location in an image may be called a "pixel." In an array defining an image in which each item of data provides a value, each value indicating the color of a location may be called a "pixel value." A pixel's value in an image that is a version of another image may indicate an attribute of a region of the other image that includes the pixel.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "bounding box" for a connected component is a rectangle just large enough to include all the pixels in the connected component, and can be specified by coordinates.

A "constraint" on parts of images or of image sets or on features shown by images or by image sets is a requirement or other limitation that the parts or features must satisfy.

An operation uses data to "determine" whether a proposition is true if the operation uses the data to obtain other data indicating whether the proposition is true. For example, an operation can use data defining an image to determine whether parts of the image satisfy a constraint, in which case the operation will obtain data indicating whether the image includes parts that satisfy the constraint.

A criterion is an example of a constraint. If a criterion "requires" a part of an image or of an image set with a characteristic or that has a characteristic, only parts with the characteristic or that have the characteristic meet the criterion.

A first item of data is produced by "applying a criterion" to a second item of data when the first item indicates whether the second item meets the criterion. An operation that applies a criterion produces such an item of data.

A criterion can be "applied" to a connected component or other part of an image or of an image set by applying the criterion to an item of data defining the image in a manner that depends on the connected component or other part. A connected component or other part of an image or of an image set "meets a criterion" if application of the criterion to the part produces an item of data indicating that the part meets the criterion. Numerous criteria can be applied to connected components and other parts of an image or of an image set. For example, a criterion can require a connected component to enclose more pixels or less pixels than the pixels in the connected component; a criterion can require a connected component to be the connected component nearest to another connected component; or a criterion can require a connected component to have a length that is greater than its distance to another connected component.

An operation includes a "sequence of iterations" when the operation includes a sequence of substantially similar sub-operations, each referred to as an "iteration," where each iteration after the first uses starting data produced by the preceding iteration to obtain ending data. Each iteration's ending data can in turn be used by the following iteration. A "change occurs" during an iteration if the iteration's ending data is different than its starting data; an iteration during which no change occurs can be the last iteration, because no change will occur during further iterations.

A sequence of iterations "propagates" a constraint if each iteration includes an operation that determines whether items indicated by its starting data satisfy the constraint, and obtains ending data that indicates only the items that satisfy the constraint. For example, if the starting data and ending data define images, the ending data could define an image that includes only the parts of the starting image that satisfy the constraint.

An operation uses data to "determine" whether a proposition is true if the operation uses the data to obtain other data indicating whether the proposition is true. For example, an operation can use data defining an image showing a graphical feature to determine whether the graphical feature satisfies a constraint, in which case the operation will obtain data indicating whether the graphical feature satisfies the constraint.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

An "area" within an image is a bounded part of the image within which all pixels meet a criterion for neighboring. Therefore, two abutting areas form a larger area that includes both of them. An area can be defined without regard to the content of the image.

A feature "encloses" an area within an image if the feature divides the image into two or more parts, one of which is an area that includes the enclosed area and does not include any part of the border of the image. Areas are often described in terms of features that enclose them.

A "perimeter" is a connected component enclosing an area within an image.

A "relationship among distinctions" is a relationship indicating how the distinguished sets or categories of items are related. For example, one set may be a subset of another; two sets may be mutually exclusive; or two sets may intersect. The term "element" is often used to indicate an item in a set; intersecting sets "share" at least one element.

A "perimeter relationship representation" is a graphical representation in which perimeters represent distinctions. Each perimeter represents a distinction between items that fall within a set or category and items that fall outside the set or category. The perimeters enclose areas in a way that indicates a relationship among the distinctions they represent. One common type of perimeter relationship representations is the Venn or set membership diagram; another is an isometric map, such as a map with lines of equal elevation, equal barometric pressure, and so forth; some statecharts, organization charts, and block-structured program diagrams are perimeter relationship representations.

A "label" is an identifying mark in an image.

A "set identifier" identifies a set or category. A "perimeter label" is a label identifying a perimeter. In a perimeter relationship representation, a perimeter label can be a set identifier.

An "element identifier" identifies an element within a set or category. An "item label" in a perimeter relationship representation is a label identifying one of the items being distinguished by perimeters. In a perimeter relationship representation, an item label can be an element identifier.

A "perimeters feature" is a feature that defines one or more perimeters. A perimeters feature can include perimeters, perimeter labels, and item labels.

A perimeters feature "encloses areas" of an image if each of the areas is enclosed within one of the perimeters the feature defines.

Parts of an image "enclose areas" of an image if the parts, taken together, enclose each of the areas.

A "certain multiple" of an area is a value equal to a product of a measure of the area with a constant that is a positive real number.

A first area is "greater than" a second area if a measure of the first area is greater than a measure of the second area.

Two or more areas "together are greater than" an area if the sum of measures of the two or more areas is greater than a measure of the area.

An area "contains" a connected component, a label, or other feature if all of the pixels in the connected component, a label, or other feature are in the area. The connected component, label, or other feature is "in" the area.

An "empty perimeter" is a perimeter in a perimeter relationship representation that encloses an area that does not contain an other perimeters or labels.

A "constraint on perimeters" is a constraint that perimeters in a perimeter relationship representation must satisfy.

A perimeters feature "satisfies a constraint on perimeters" if the perimeters feature defines perimeters, each of which satisfies the constraint.

Parts of an image or image set or features shown by an image or image set "satisfy a constraint on perimeters" if the parts or features, taken together, satisfy the constraint.

B. General Features

Figure 2:
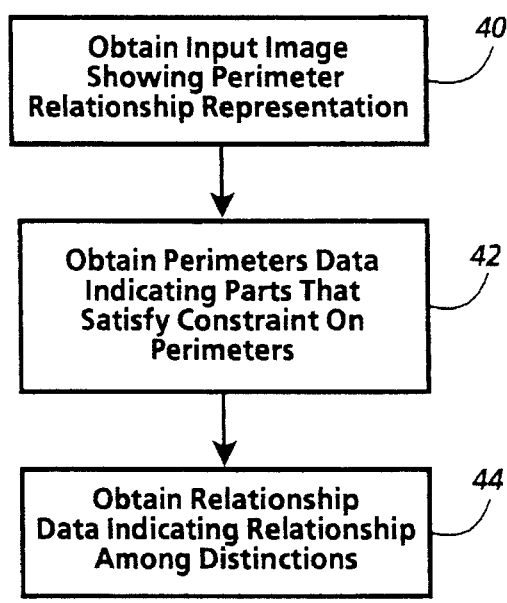
FIG. 2 is a flow diagram showing general acts in analyzing an image showing a perimeter relationship representation.
Figure 3:
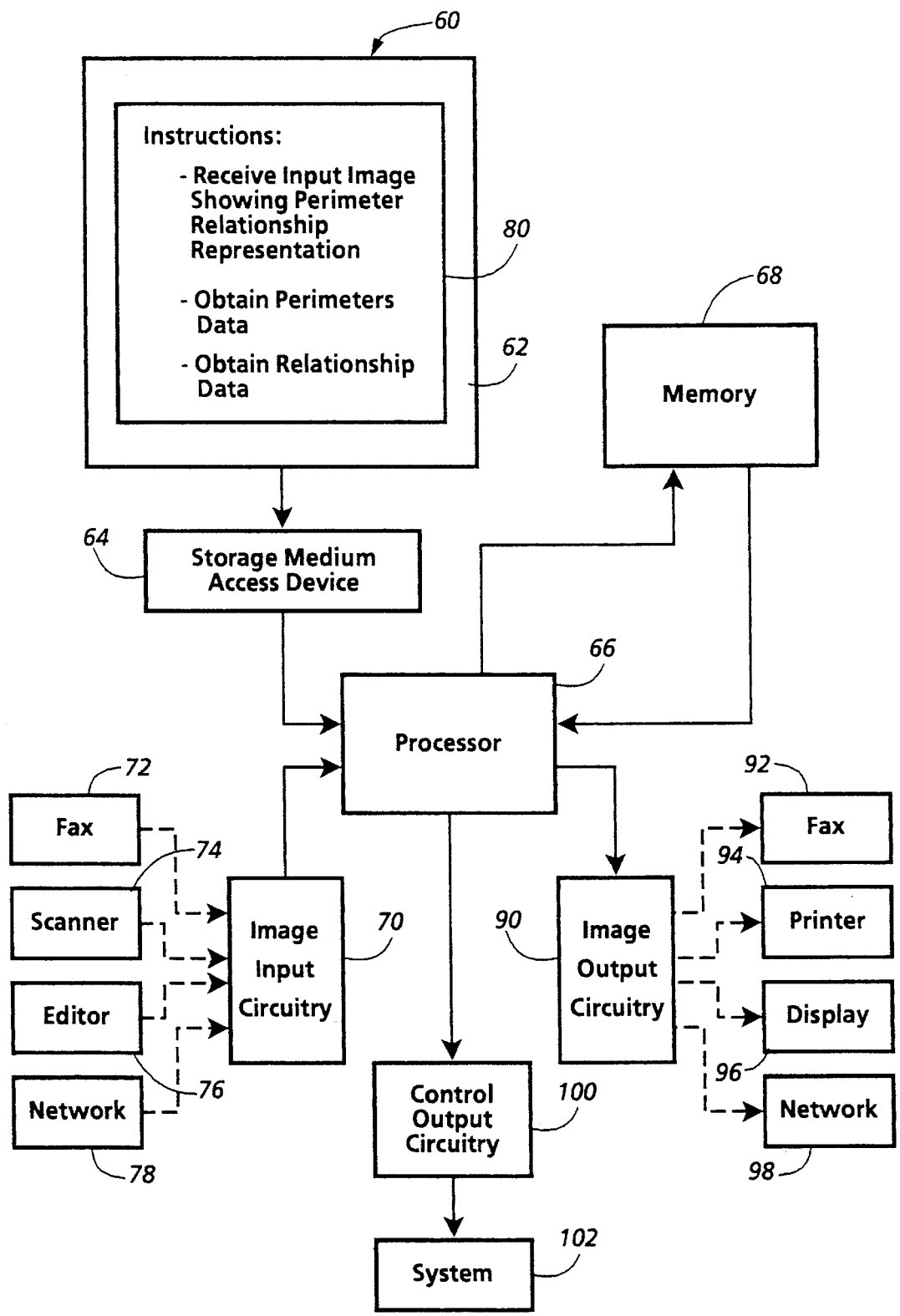
FIG. 3 is a schematic block diagram showing general components of a software product and a machine in which the software product can be used to implement the general acts in FIG. 2.

FIGS. 1–3 show general features of the invention. FIG. 1 shows schematically how an image showing a perimeter relationship representation can be analyzed. FIG. 2 shows general acts in analyzing an image showing a perimeter relationship representation. FIG. 3 shows general components of a software product and of a machine in which it can be used.

In FIG. 1, image 10 shows a perimeter relationship representation includes a perimeters feature that satisfies a constraint on perimeters. Image 10 can, for example, be a sketch. The perimeter relationship representation includes feature 12, illustratively including perimeters 14 and 16, each of which is approximately circular. A machine receiving data defining image 10 can respond by automatically obtaining perimeters data 20 indicating parts of image 10 that satisfy the constraint on perimeters; in the illustrated example, perimeters data 20 could indicate perimeters 14 and 16. Then the machine can automatically use perimeters data 20 to obtain relationship data 22 indicating a relationship between the distinctions represented by the perimeters; in the illustrated example, relationship data 22 could indicate that perimeters 14 and 16 both include at least one shared item and each also includes at least one non-shared item.

The general acts in FIG. 2 begin in box 40 by obtaining input image data defining an input image that shows a perimeter relationship representation. The perimeter relationship representation includes a perimeters feature that satisfies a constraint on perimeters. In response, the act in box 42 uses the input image data to obtain perimeters data indicating parts of the input image that satisfy the constraint on perimeters. The act in box 44 then uses the perimeters data to obtain relationship data indicating a relationship among the distinctions represented by the perimeters.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions that processor 66 can execute and also data memory storing data that processor 66 can access in executing the instructions.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

In addition to data storage medium 62, software product 60 includes data stored by storage medium 62. The stored data include data indicating image processing instructions 80, which processor 66 can execute to perform acts like those in FIG. 2. In executing instructions 80, processor 66 receives input image data defining an input image from image input circuitry 70. The input image shows a perimeter relationship representation with a perimeters feature that satisfies a constraint on perimeters. Processor 66 uses the input image data to obtain perimeters data indicating parts of the input image that satisfy the constraint on perimeters. Processor 66 then uses the perimeters data to obtain relationship data indicating a relationship among the distinctions represented by the perimeters.

Processor 66 can also be connected for providing data defining images to image output circuitry 90. For example, software product 60 could include data indicating instructions processor 66 can execute to use the relationship data to obtain output image data defining an output image. The output image could show precisely formed version of the perimeter relationship representation or another graphical representation showing the relationship, such as a table. The output image data could be provided to image output circuitry 90, and could in turn be provided to fax machine 92, to printer 94, to display 96, or to network 98.

The relationship data could also be used to provide control signals. For example, memory 68 could store control instructions processor 66 can execute to use the relationship data to obtain control data defining control signals. The control data could be provided to control output circuitry 100, which could respond by providing control signals to system 102.

Rather than being used immediately, the relationship data could instead be stored in memory 68 for possible future use. This would be appropriate, for example, where information indicating an operation to be performed on an input image has not been obtained at the time data defining the input image is received.

C. Implementation

The general features described above could be implemented in numerous ways on various machines to analyze perimeter relationship representations. An implementation described below analyzes perimeter relationship representations and uses the results to control a graphic rendering system.

1. Image Showing Perimeter Relationship Representation

Figure 4:
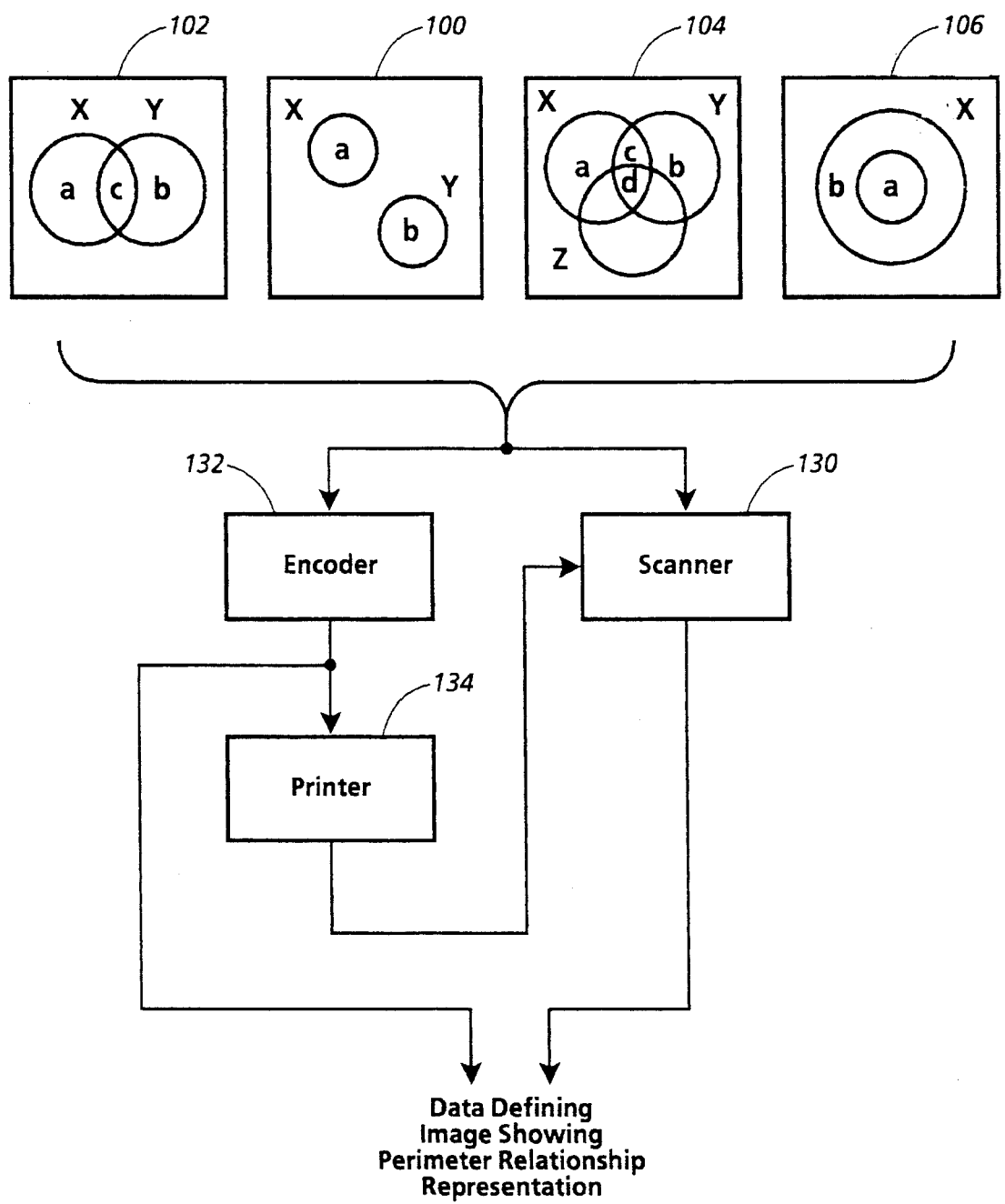
FIG. 4 is a schematic block diagram showing ways in which a user can provide data defining an image showing a perimeter relationship representation made by hand.
Figure 5:
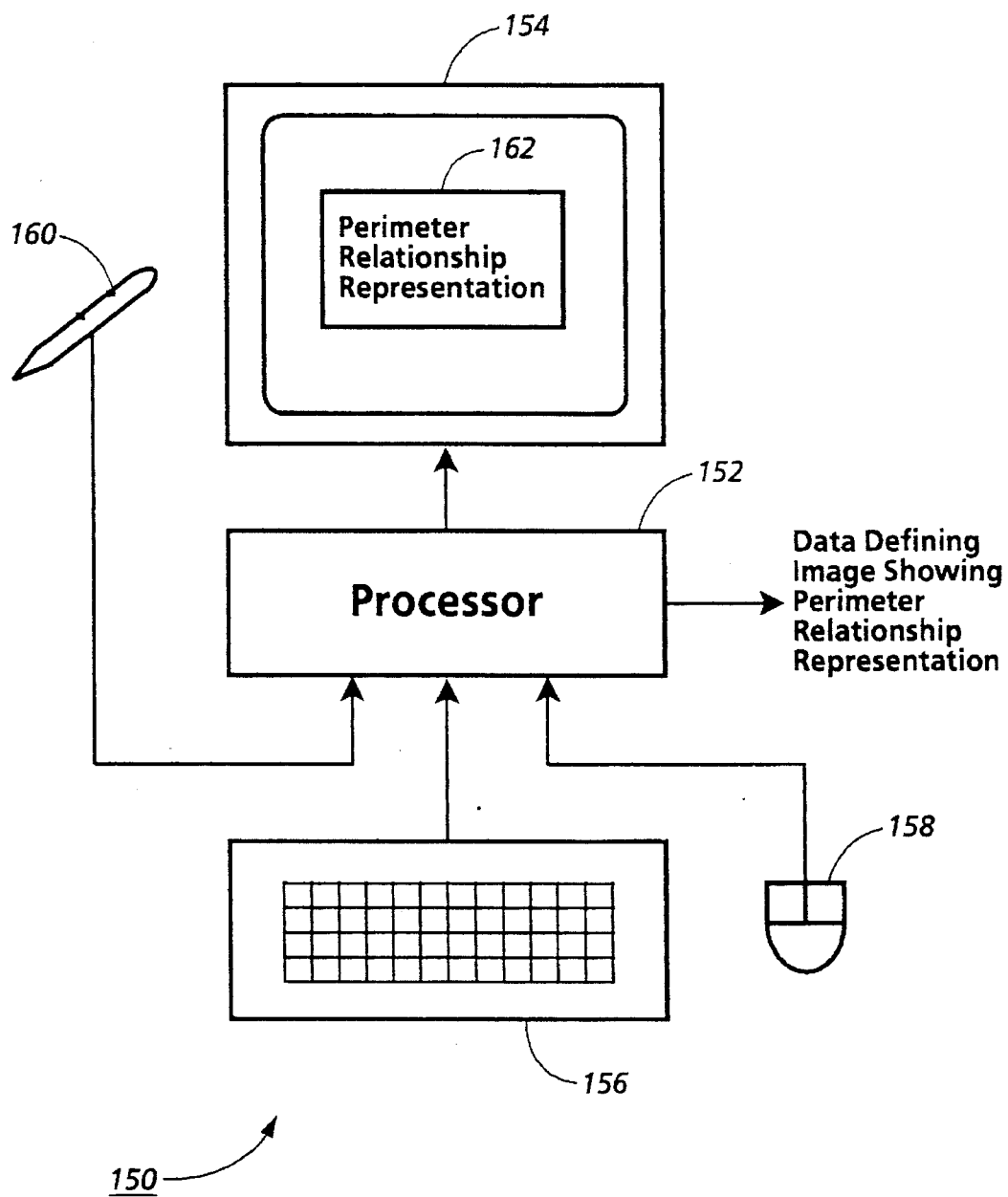
FIG. 5 is a schematic block diagram showing how a user can provide data defining an image showing a perimeter relationship representation produced interactively with a machine.

Data defining an image set showing a perimeter relationship representation can be obtained in many ways. FIG. 4 illustrates ways in which a user can provide an image showing a hand sketch of a perimeter relationship representation. FIG. 5 illustrates ways in which a user can provide an image showing a perimeter relationship representation by interacting with a machine.

FIG. 4 shows at the top several examples of images showing perimeter relationship representations. Image 100 shows a Venn or set membership diagram in which two closed curves, labeled "X" and "Y", are separate, with a label "a" inside "X" and a label "b" inside "Y". Image 102 shows a similar diagram in which "X" and "Y" cross, with a label "c" in the shared area of "X" and "Y" and with "a" and "b" in the non-shared areas as in image 100. Image 104 shows a similar diagram with a third closed curve labeled "Z" which overlaps both "X" and "Y", and with a label "d" in the portion of the shared area of "X" and "Y" that is also shared by "Z". Image 106 shows a diagram in which two closed curves are nested, with a label "a" inside an inner curve and a label "b" inside an outer curve, labeled "X".

As suggested by the examples, a wide variety of perimeter relationship representations can be formed. The example in image 106 also applies to isometric maps, such as maps with lines of equal elevation or equal barometric pressure. The example in image 106 can also be applied to organization charts and other representations in which nested rectangular perimeters are used to represent distinctions.

In general, the images in FIG. 4 can be obtained in any appropriate way. For example, the perimeter relationship representations can be sketches produced by marking actions performed on a marking medium by hand.

If the marking medium is a sheet, scanner 130 can receive the sheet. Scanner 130 operates on the sheet to provide data defining an image showing a perimeter relationship representation.

If the marking medium is a marking surface of an electronic device that can sense marks, encoder 132 can receive signals from the electronic device and use the signals to obtain data defining an image showing a perimeter relationship representation. This data can then be provided to printer 134 to obtain a sheet on which marks are printed, and this sheet can be provided to scanner 130. Scanner 130 provides data defining an image showing a perimeter relationship representation.

FIG. 4 also shows that data from encoder 132 could be used directly as data defining an image showing a perimeter relationship representation. This would be appropriate if encoder 132 could provide data defining an image in response to marking actions.

FIG. 5 shows machine 150, which could be a personal computer, a workstation, or another data processing system. Machine 150 includes processor 152; display 154; keyboard 156; pointing device 158, illustratively a mouse; and screen position indicating device 160, illustratively a stylus. A user can operate keyboard 156 and pointing device 158 to provide signals to processor 152. Or a user can perform marking actions with screen position indicating device 160 on the surface of display 154 to provide signals to processor 152. In response, processor 152 presents and modifies image 162 on display 154, so that the user can continue to provide signals until image 162 shows a desired perimeter relationship representation. Then the user can provide a signal requesting that processor 152 provide data defining image 162.

Processor 152 could execute a number of types of software to permit a user to produce an image in the manner described above. Processor 152 could execute document editing software or image editing software, for example.

Data defining an image showing a perimeter relationship representation could be produced in any of the ways shown in FIGS. 4 and 5 or in any other appropriate way.

2. System

Figure 6:
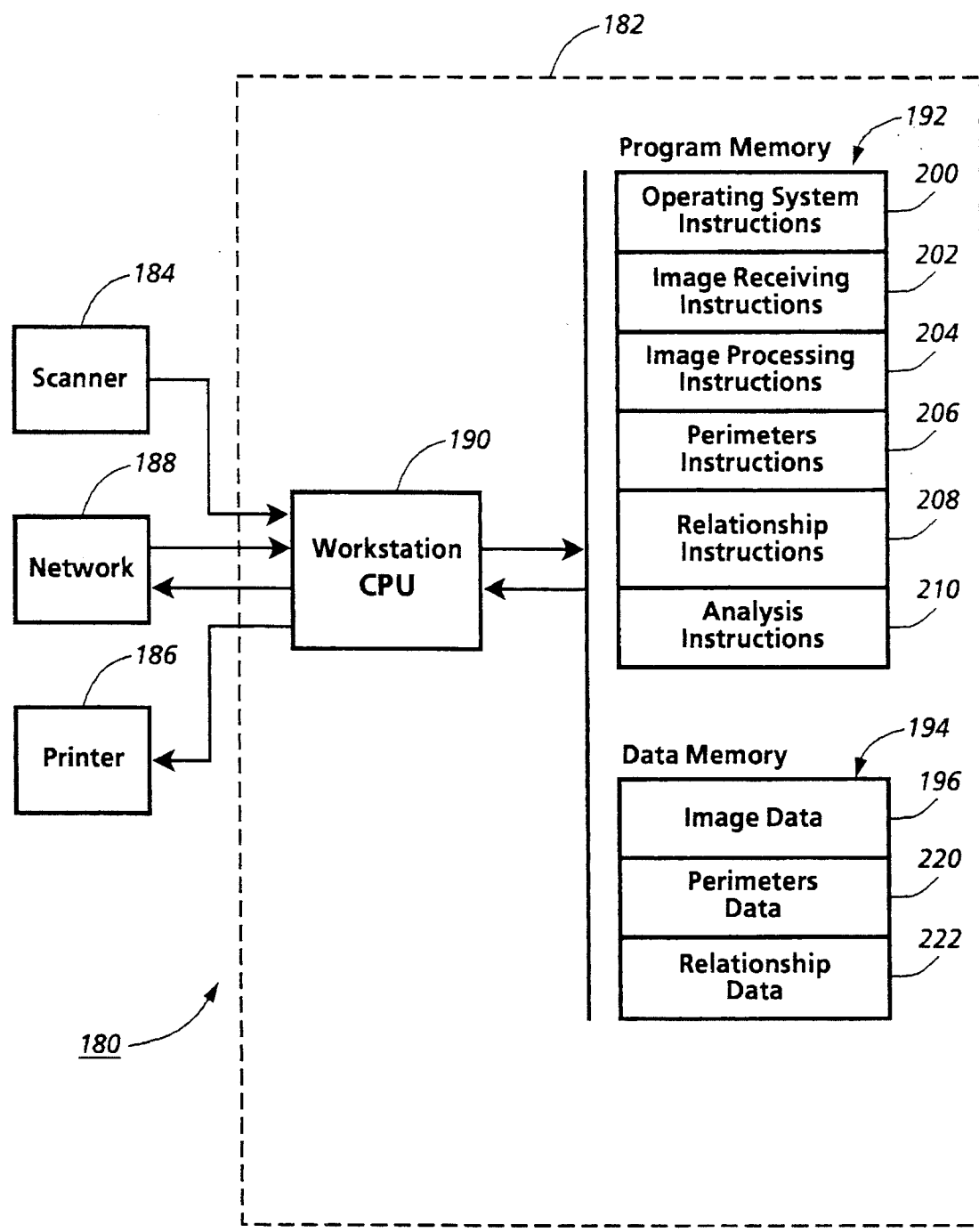
FIG. 6 is a schematic block diagram of a machine that can analyze an image showing a perimeter relationship representation.

FIG. 6 shows a system in which the general features described above have been implemented.

System 180 in FIG. 6 includes workstation 182, a Sun SPARCStation 10 workstation. Scanner 184 can be a conventional scanner such as a Xerox Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining an image showing a perimeter relationship representation from scanner 184 as described above in relation to FIG. 4. Similarly, CPU 190 can receive data defining an image obtained in the manner described above in relation to FIG. 5 from network 188. In addition, workstation CPU 190 is connected to access program memory 192 and data memory 194 and other conventional workstation peripherals (not shown). Data memory 194 is illustratively storing image data 196 defining an image showing a perimeter relationship representation.

Program memory 192 stores instructions CPU 190 can execute to perform operations implementing the general acts in FIG. 2. CPU 190 executes operating system instructions 200 that provide a Unix operating system or other appropriate operating system. Each of the other sets of instructions stored by program memory 192 can be obtained from source code in a conventional programming language such as Lisp, C, or the like with conventional compiler or interpreter techniques. When executed, these other instructions make calls to operating system instructions 200 in a conventional manner. In general, the instructions can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180.

In executing image receiving instructions 202, CPU 190 receives data defining an image and stores it in data memory 194, as illustrated by image data 196. The data defining the image may be received from scanner 184 or network 188.

In executing image processing instructions 204, CPU 190 calls perimeters instructions 206 and relationship instructions 208. Image processing instructions 204 also perform other operations relating to analysis of perimeter relationship representations.

In executing perimeters instructions 206, CPU 190 calls analysis instructions 210 to perform basic geometric analysis of the image defined by image data 196, producing perimeters data 220. Perimeters data 220 indicate a feature that defines two or more perimeters.

In executing relationship instructions 208, CPU 190 can call analysis instructions 210 to perform basic geometric analysis of an image defined by perimeters data 220, producing relationship data 222. Relationship data 222 indicate a relationship among the perimeters defined by the feature indicated by perimeters data 220.

3. Perimeter Relationship Representation Analysis

Figure 7:
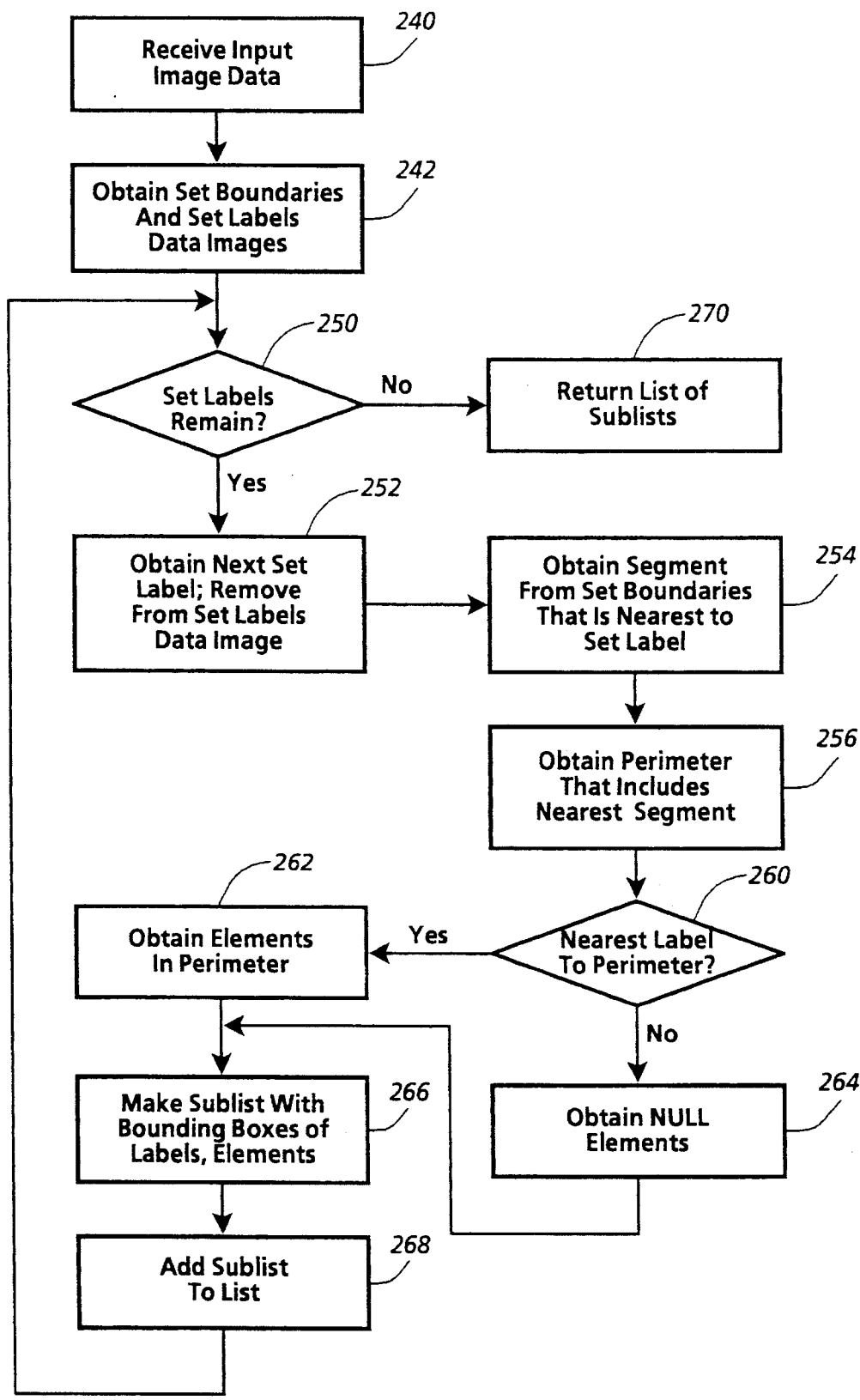
FIG. 7 is a flow chart of acts performed by the machine of FIG. 6.
Figure 8:
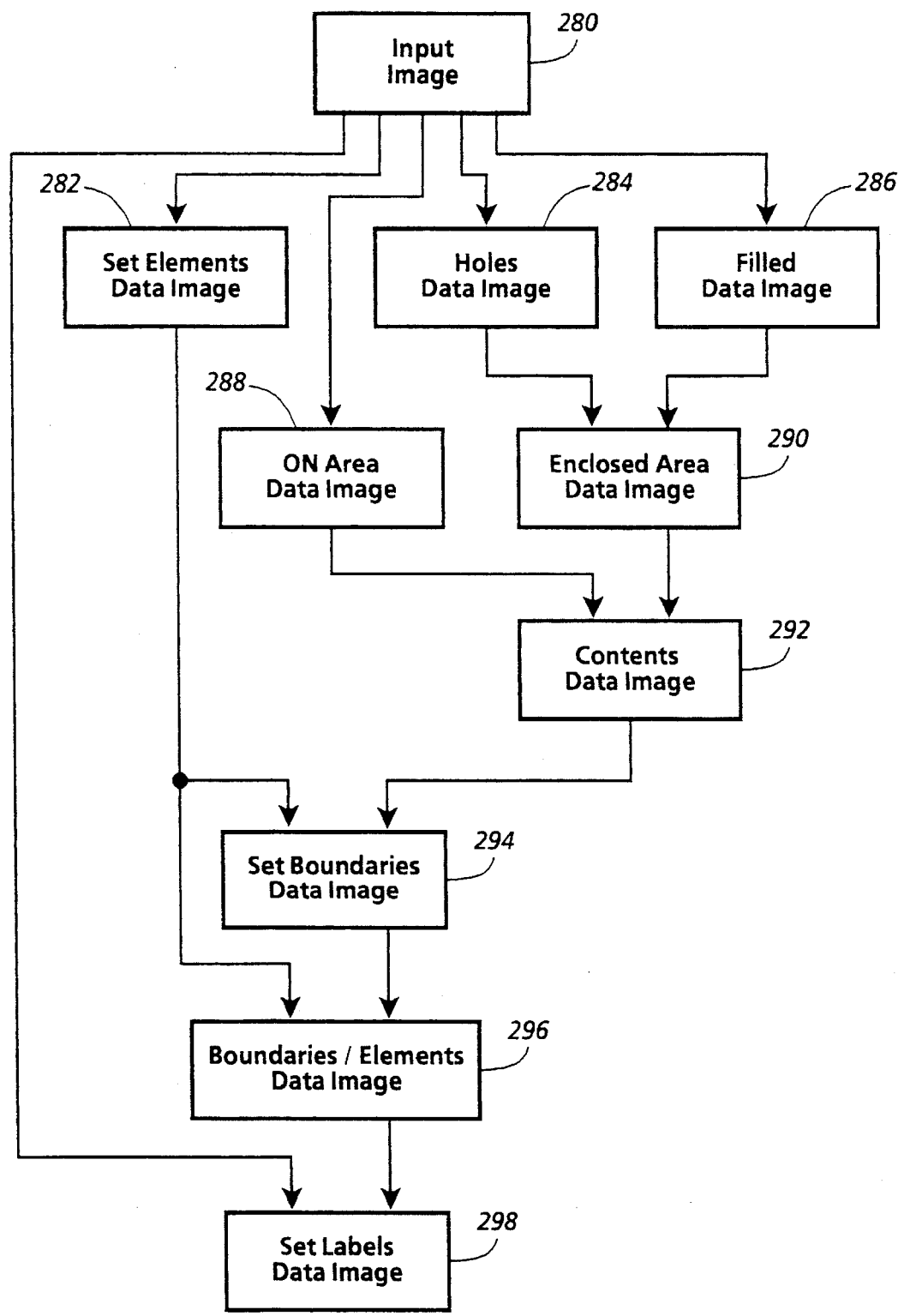
FIG. 8 is a schematic flow diagram of data images used in obtaining a set labels data image in FIG. 7.

FIG. 7 shows acts in executing image processing instructions 204 in FIG. 6. FIG. 8 shows data images obtained in executing perimeters instructions 206 in FIG. 6.

Many of the acts in FIGS. 7 and 8 are performed on items of data, each of which defines an image. Each item is referred to as a "data image." Some data images can be used in obtaining others. In general, all of the data images define images with the same number of pixels, and each operation produces an image with the same number of pixels. An operation on two images typically uses values of pairs of pixels to produce, for each pair, a pixel value in an image being produced; within each pair, one pixel is from each image and the two pixels in the pair are both at the same location as the pixel value in the image being produced. Many examples of such operations are described in copending, coassigned U.S. patent application Ser. No. 08/157,600, entitled "Analyzing an Image Showing a Node-Link Structure" ("the Node-Link Structure Application"), and in copending, coassigned U.S. patent application Ser. No. 08/157,804, entitled "Analyzing Image Showing Editing Marks to Obtain Category of Editing Operation" ("the Editing Application"), both of which are incorporated herein by reference.

The act in box 240 in FIG. 7 begins by receiving data defining an input image. The input image data may have been received previously by executing image receiving instructions 202, and may be provided with a call to image processing instructions 204.

The act in box 242 uses the input image data from box 240 to obtain a set boundaries data image and a set labels data image. As described above, a perimeter relationship representation in the input image includes a perimeters feature that meets a constraint on perimeters. The constraint can include, for example, a perimeter size criterion or other appropriate criteria for distinguishing perimeters from labels. The act in box 242 obtains a set boundaries data image showing parts of the input image that satisfy a perimeter size criterion, as discussed below in greater detail. The act in box 242 also obtains a set labels data image showing parts of the input image that do not satisfy the perimeter size criterion but satisfy a set label criterion, meaning that each could be a perimeter identifier.

The act in box 250 begins an iterative loop that performs an iteration for each connected component in the set labels data image. The act in box 252 begins each iteration by obtaining a next set data image showing the next set label and by then removing the next set label from the set labels data image for subsequent iterations.

The act in box 252 can obtain the next set data image by first obtaining a distances data image in which each pixel is labeled with its distance from the top left corner of the image. The act in box 252 can then perform a spread operation as described in relation to FIG. 7 of the Node-Link Structure Application to obtain a top left distances data image in which each pixel in each connected component in the set labels data image is labeled with the minimum distance from the distances data image of the pixels in the connected component. The act in box 252 can perform an operation to find the lowest distance of the pixels in the top left distances data image, and this lowest distance can be compared with the label of each pixel in the top left distances data image to obtain the next set data image in which each pixel in the top left component in the set labels data image is ON.

The act in box 252 could alternatively obtain the next set data image using a seed data image in which only the top left pixel is ON. The act in box 252 could obtain a neighbor identifier data image in which each pixel is labeled with a unique identifier of a near connected component in the set labels data image, using a read operation as described in relation to FIG. 7 of the Node-Link Structure Application. The act in box 252 could then perform a spread operation as described in relation to FIG. 7 of the Node-Link Structure Application to obtain a labeled data image in which each pixel has the maximum value from the seed data image of pixels that have the same value in the neighbor identifier data image. The act in box 252 can then AND the labeled data image with the set labels data image to obtain the next set data image.

The act in box 252 can AND the complement of the next set data image with the set labels data image to obtain an updated set labels data image for the next iteration.

The act in box 254 uses the set boundaries data image and the next set data image to obtain a nearest segment data image showing a segment from the set boundaries data image that is nearest to the next set. The act in box 254 can be implemented by first using the set boundaries data image to obtain a segments data image that shows the segments that extend between crossings. The act in box 254 can then use the next set data image and the segments data image to find the nearest segment.

The act in box 254 can obtain the segments data image by using the set boundaries data image to obtain a branching factor data image as described in relation to FIG. 7 of the Node-Link Structure Application. The segments data image can then be obtained by making each pixel ON that has a value of two in the branching factor data image for each connected component, then ORing all the results together.

The act in box 254 can find the nearest segment by first ORing the segments data image and the next set data image to obtain a union data image. The act in box 254 can use the union data image to obtain three other data images-a source data image, an x-offset data image, and a y-offset data image.

To obtain the x- and y-offset data images, the act in box 254 can first use the union data image to obtain an edges data image that is a union of the four edge data images obtained as described in relation to FIG. 7 of the Node-Link Structure Application. The act in box 254 can then do a set difference operation to remove the edges shown in the edges data image from the union data image, obtaining a starting data image. The act in box 254 can obtain the x- and y-offset data images using the starting data image as described in relation to FIG. 7 of the Node-Link Structure Application. The x-offset data image indicates, at each pixel, the offset in the x direction to the nearest connected component in the starting data image. The y-offset data image similarly indicates the offset in the y direction.

The act in box 254 can use the x- and y-offset data images to obtain a link points data image showing pixels in the starting data image that have a neighbor on another connected component. The act in box 254 can first label each connected component in the starting data image with a unique identifier as described in relation to FIG. 7 of the Node-Link Structure Application. Then the act in box 254 can read the unique identifier from each pixel's nearest neighbor and compare it with the pixel's own unique identifier to obtain the link points data image.

The act in box 254 can use the set labels data image and the link points data image to obtain the source data image mentioned above, in which each pixel is labeled with its minimum value from the set labels data image and the link points data image. The act in box 254 can then perform a write operation to obtain a written data image in which each pixel's value in the source data image is written to its nearest neighbor as indicated by the x- and y-offset data images, resolving any collisions by retaining the maximum value. The act in box 254 can then perform a color operation as described in relation to FIG. 7 of the Node-Link Structure Application to obtain a data image showing each connected component in the segments data image that includes a pixel that is ON in the written data image, producing the nearest segment data image.

The act in box 256 uses the nearest segment data image from box 254 and the set boundaries data image from box 242 to obtain a perimeter data image showing a perimeter that includes the nearest segment. The act in box 256 can be implemented by performing a trace operation.

The trace operation can begin by using the segments data image obtained in box 254 to perform a read operation to obtain a segment identifier data image in which each pixel is labeled with the identifier of the nearest segment shown in the segments data image. Techniques like those described in relation to FIG. 7 of the Node-Link Structure Application can be used to perform the read operation.

The trace operation can use the segment identifier data image to initialize several working data images. A current segment data image shows a current segment region, and is initialized by performing a color operation using the segment identifier image and the nearest segment data image from box 254, so that it shows the nearest segment. A remaining segment regions data image shows remaining segment regions, and it is obtained by taking the complement of the initialized first working data image. A result figure data image shows the result of an iteration, and it is initialized to be the same as the initialized first working data image. A current branch data image shows a current branch. A flanking regions data image shows current segment flanks. The current branch and flanking regions data images are both initialized so that all pixels have the value zero.

The trace operation can then perform a series of iterations that continues until the current segment data image includes no ON pixels. Each iteration obtains a new set of working data images. In effect, each iteration operates to select, at each crossing point at an end of the current segment region, the middle branch. The strategy is to use the edge of the complement of a region to color adjacent, flanking regions so that the middle branch can be selected by elimination because it is not colored.

Each iteration can obtain a new current branch data image using the current segment and current branch data images from the previous iteration and a junction identifier data image. Each iteration obtains an intersection data image using the current segment and current branch data images, and then performs a color operation to obtain the new current branch data image showing each connected component in the junction identifier data image that includes a pixel that is ON in both the current segment and current branch data images.

The trace operation can obtain the junction identifier data image before the first iteration because the junction identifier data image does not change during the iterations. The trace operation can obtain the junction identifier data image by using the set boundaries data image from box 242 to obtain a branching factor data image as described above in relation to box 254. The trace operation can then obtain the union of pixels that have branching factors of three and four, and can then label each connected component in the union with a unique identifier to obtain the junction identifier data image.

Each iteration can obtain a new flanking regions data image using the segment identifier data image, the current segment and remaining segment regions data images from the previous iteration, and the new current branch data image. Each iteration can use the current segment and remaining segment regions data images to obtain an adjacent data image; the complement of the remaining segment regions data image can be used to obtain an edges data image as described above in relation to box 254, and the intersection of the current segment data image and the edges data image is the adjacent data image. A color operation can be performed to obtain a color data image showing the connected components in the segment identifier data image that include pixels that are ON in the adjacent data image. A set difference operation can then be performed to remove any connected components in the new current branch data image from the color data image, producing the new flanking regions data image.

Each iteration can obtain a new remaining segment regions data image by first obtaining the union of the current segment data image from the previous iteration and the new remaining segment regions data image. Then a set difference operation can be performed to remove any connected components in the union from the previous iteration's flanking regions data image, producing the new remaining segment regions data image.

Each iteration can obtain a new current segment data image by first obtaining the intersection of the new remaining segment regions and current branch data images. Then a color operation can be performed to obtain a color data image showing the connected components in the segment identifier data image that include pixels that are ON in the intersection.

Finally, each iteration can obtain a new result figure data image by obtaining the union of the previous iteration's result figure data image and the new current segment data image. After each iteration, the result figure data image shows segment regions of a curve being traced, not the curve itself.

After the final iteration, the trace operation uses the final iteration's result figure data image to obtain a perimeter data image. The trace operation first obtains an intersection of the final iteration's result figure data image and the set boundaries data image from box 242. Then the trace operation obtains two distances data images as described in relation to FIG. 7 of the Node-Link Structure Application, a first one in which each pixel is labeled with the distance to the nearest connected component in the intersection and a second one in which each pixel is labeled with the distance to the nearest connected component in the segments data image. The distances data images are used to obtain an exclusive closer data image in which a pixel is ON if its distance in the first distances data image is smaller than its distance in the second distances data image. The trace operation then obtains the intersection of the exclusive closer data image and the set boundaries data image from box 242 to obtain the perimeter data image.

The act in box 260 branches based on whether the set label obtained in box 252 is the nearest connected component in the set labels data image to the perimeter shown in the perimeter data image. If so, the set label and the perimeter meet a perimeter label criterion that is part of the constraint on perimeters, and the act in box 262 obtains an elements data image for the set enclosed by the perimeter. If not, the set label does not meet the perimeter label criterion, so the act in box 264 returns a null data image in which each pixel's value is zero.

The act in box 260 can be implemented by first using the perimeter data image and the set labels data image to obtain a nearest set label data image in much the same way the nearest segment data image is obtained in box 254. Then the nearest set label data image can be compared at each pixel with the next set label data image from box 252 to determine whether all pixels in the two data images are equal.

The act in box 262 can be implemented by using the internals data image described above in relation to box 242 and the perimeter data image. First, the act in box 262 can use the perimeter data image to obtain a holes data image as described in relation to FIG. 7 of the Node-Link Structure Application. Then the act in box 262 can AND the holes data image with the internals data image to obtain the elements data image showing any connected components within the perimeter.

The act in box 266 creates a sublist of bounding boxes, each of which can be a list of four items—a left x coordinate, a top y coordinate, a width, and a height. The first item in the sublist is a bounding box for the set label shown in the next set label image from box 252. Each of the following items, if any, is a bounding box for a connected component in the elements data image from box 262. The sublist includes no following items if the act in box 264 was performed.

The act in box 268 adds the sublist from box 266 to a list of sublists from previous iterations. When all the set labels have been handled, the act in box 270 returns the list of sublists. The list of sublists indicates a relationship among distinctions represented by perimeters because it indicates which elements are in each perimeter, thus indicating which elements are shared and which are not shared.

Many of the operations described above have been described by reference to operations described in the Node-Link Structure Application. Because many of the operations are performed on perimeters which are closed curves, it can be advantageous to thin the connected components as follows: Label each connected component in the complement with a unique identifier; then read the nearest neighbor's identifier to each white pixel in the complement; then obtain the thinned data image by leaving a pixel ON only if one of its neighboring pixels has read a different nearest neighbor's identifier. This technique is generally satisfactory for operations on closed curves.

The implementation in FIG. 7 extracts bounding boxes for set labels, but other approaches could be used in obtaining data defining an image of a set label. For example, optical character recognition could be performed, and a recognized character could then be obtained from a standard typeface. Or each set label could be indicated by a number of connected components, which could be counted, then provided in numeral form.

In addition, the implementation in FIG. 7 obtains relationship data indicating which elements are in each set. Another approach would be to obtain relationship data indicating which enclosed area within the diagram is within each perimeter; this would be advantageous if some enclosed areas do not include any element labels. A holes data image showing each enclosed area as a separate connected component could be obtained from a set boundaries data image, and each connected component in the holes data image could be labeled with a unique identifier; then each boundary could be obtained and the enclosed areas it encloses could be identified to obtain relationship data. It would also be possible to obtain relationship data indicating, for each enclosed area, which element labels occur in the enclosed area. Relationship data might also be obtained from spatial relationships among perimeters or from other properties.

FIG. 8 shows how the act in box 242 in FIG. 7 can be implemented. Each box in FIG. 8 represents a data image. Input image data 280 is received from box 240 in FIG. 7.

The act in box 242 can obtain set elements data image 282 as an internals data image from input image data 280 as described in relation to FIG. 7 in the Node-Link Structure Application. The act in box 242 can similarly obtain holes data image 284, filled data image 286, and ON area data image 288 from input image data 280 as described in relation to FIG. 7 in the Node-Link Structure Application.

The act in box 242 can obtain enclosed area data image 290 using holes data image 284 and filled data image 286. The act in box 242 can perform a spread operation, labeling each pixel in a connected component in filled data image 286 with the sum of the values of pixels in holes data image 284 that are in the connected component, which indicates the enclosed area within the connected component.

The act in box 242 can then use enclosed area data image 290 and ON area data image 288 to obtain contents data image 292. The value of each pixel in ON area data image 286 is multiplied by a positive real value so that each pixel is labeled with a certain multiple of the area of the connected component that includes it. Then, at each pixel, this multiple of the ON area is compared with the enclosed area from enclosed area data image 290, and a pixel is ON in contents data image 292 if its enclosed area is greater than the multiple of the ON area. This operation applies a perimeter size criterion, requiring a connected component to enclose an area that is greater than a certain multiple of the area of the connected component. The positive real value multiplier can be chosen empirically; a value of 3 has been satisfactory in some cases.

The act in box 242 can then AND contents data image 292 with the complement of set elements data image 282 to obtain set boundaries data image 294. Set boundaries data image 294 indicates parts of the input image that meet the perimeter size constraint described above, which is part of the constraint on perimeters.

The act in box 242 can then OR set boundaries data image 294 and set elements data image 282 to obtain boundaries/elements data image 296. Finally, the act in box 242 can AND the complement of boundaries/elements data image 296 to obtain set labels data image 298, showing those parts of the input image that are neither perimeters nor internal to connected components. The parts shown by set labels data image 298 meet a set labels criterion, which requires connected component that do not meet the perimeter size criterion and are outside perimeters.

4. Examples

Figure 9:
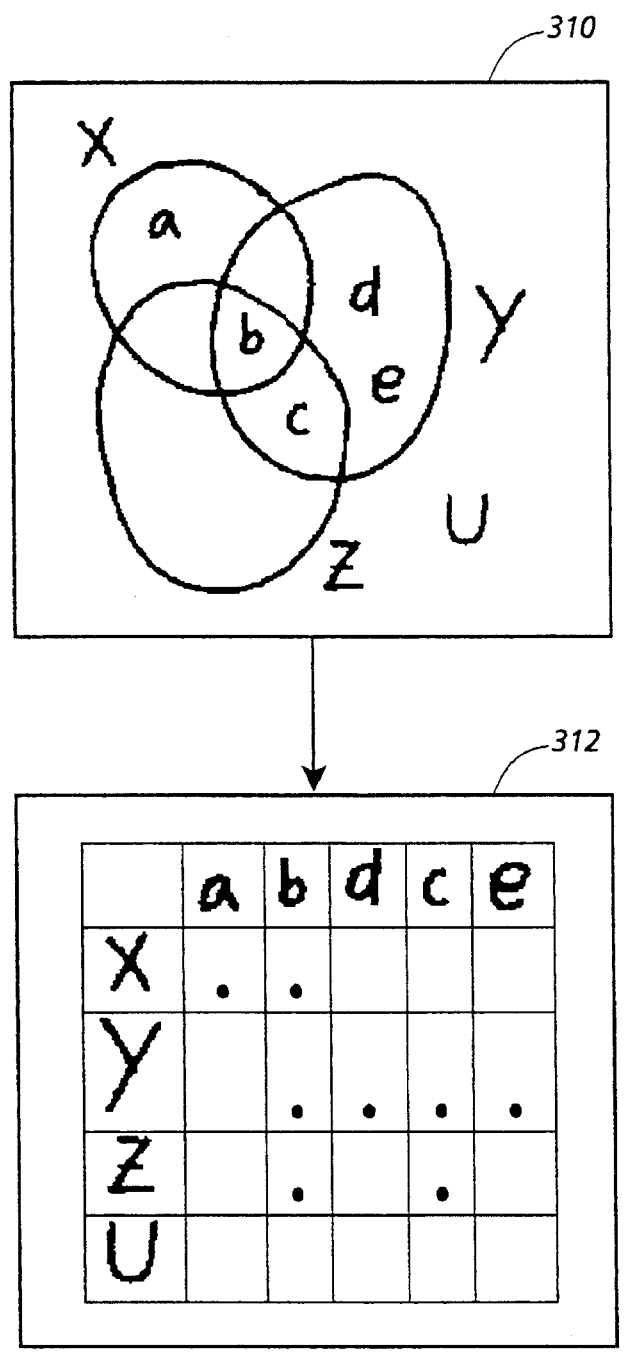
FIG. 9 shows an example of a sketch of a perimeter relationship representation and a table obtained using techniques shown in FIGS. 6–8.

The list from box 270 in FIG. 7, indicating a relationship among perimeters, can be used for various purposes. For example, it can be used to obtain another representation of the relationship, such as a table. FIG. 9 illustrates how a list obtained from a sketch of a Venn diagram has been used to obtain a table representing a relationship among perimeters.

In FIG. 9, input image 310 shows a sketch of a perimeter relationship representation that is a Venn or set membership diagram. The sketch includes a three closed curves forming three perimeters that intersect. Outside the closed curves are labels for sets, including labels "X", "Y", and "Z" for the perimeters and "U" for the set that is complementary to the union of the other sets. Inside the closed curves are labels for elements, including "a", "b", "c", "d", and "e".

When a list of sublists is obtained from input image 310 as described above in relation to FIG. 7, the list can be used to produce output image 312. As shown, output image 312 is a table. Each row is labeled at the left with a set label from input image 310, and each column is labeled at the top with an element label from input image 310. The space at the intersection of each row and column includes a dot or bullet if the element label at the top of the column appears in the perimeter whose set label is at the left of the row.

A rendering operation can produce a table as in output image 312 using a list of sublists like that returned in box 270 in FIG. 7. The rendering operation can begin by setting up a LaTex command string or other page description language (PDL) file which can be provided to a printer when completed. The rendering operation can then obtain the list of sublists and also two other lists—a labels list of bounding boxes for connected components shown in set labels data image 298 in FIG. 8 and an elements list of bounding boxes for connected components shown in set elements data image 282 in FIG. 8. The rendering operation can append the labels list and the elements list and go through the appended list to find the maximum height of the bounding boxes; the maximum height can then be used to scale all other heights to the size of the output. Then the rendering operation can perform several iterative loops to create a table string that can be included in the LaTex command string in the math mode.

A first iterative loop can go through the bounding boxes in the labels list, obtaining a list of postscript files for the set labels, each defining a box in the list. A second iterative loop can similarly go through the bounding boxes in the elements list, obtaining a list of PostScript files for the element labels. A third iterative loop can go through the list of sublists, putting a bullet into the space at the intersection of each set label's row and an element label's column where the element label's box from the element list is the same as a box in the set label's sublist. A final iterative loop can go through the rows of the table, creating a LaTex table string.

5. Variations

The implementation described above uses particular operations described above to obtain perimeter data and relationship data from an image showing a perimeter relationship representation. Numerous other combinations of operations besides those described above could be used to obtain perimeter data and relationship data.

The implementation described above uses a constraint on perimeters that includes a perimeter size criterion to distinguish perimeters from labels. Other criteria could be employed, and, if appropriate, constraint propagation can be used.

Figure 10:
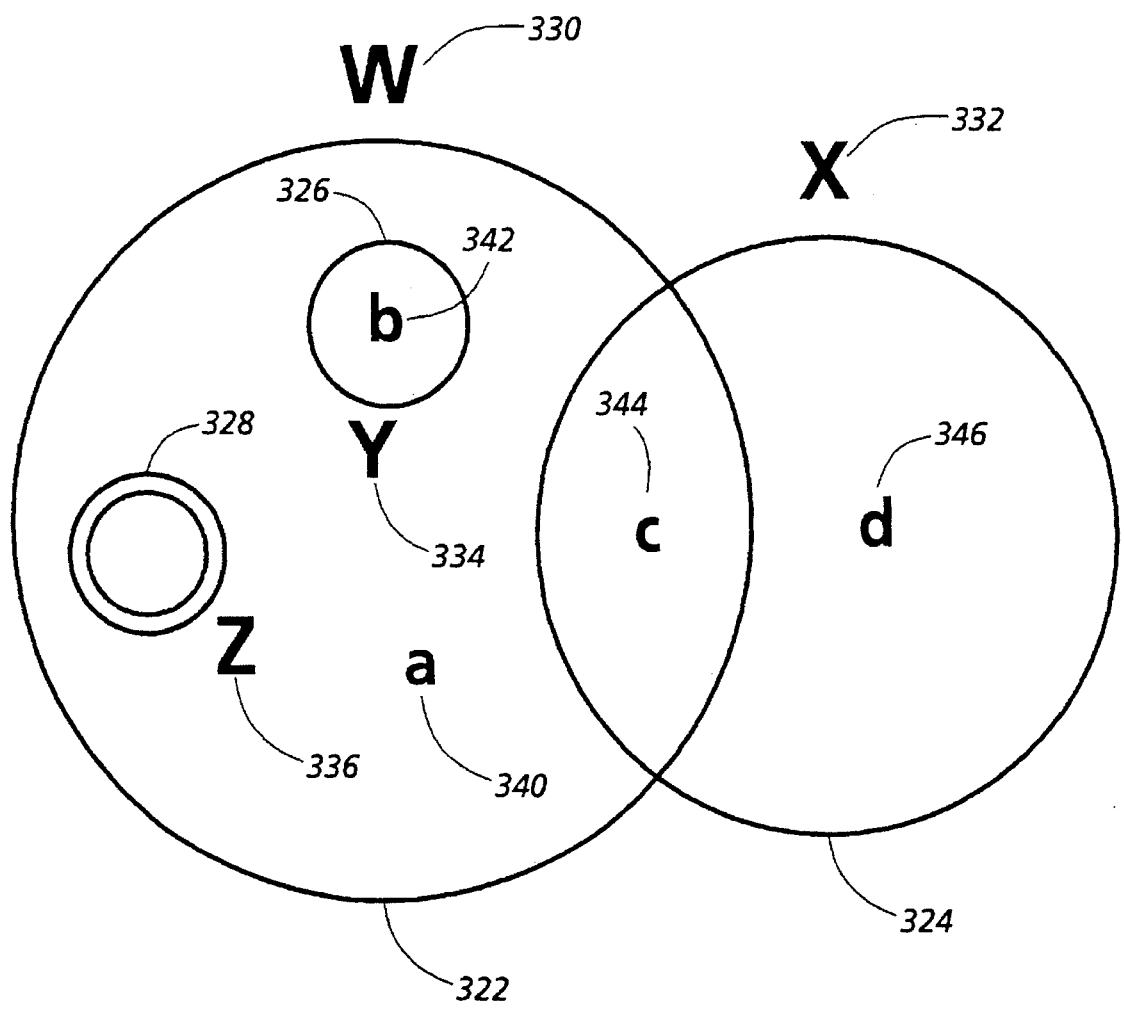
FIG. 10 shows a perimeter relationship representation with a perimeters feature that meets a perimeter label criterion.

FIG. 10 illustrates a perimeter relationship representation for which criteria different than those described above are appropriate.

Perimeters feature 320 in FIG. 10 includes perimeters 322, 324, 326, and 328; set labels 330, 332, 334, and 336; and element labels 340, 342, 344, and 346. An appropriate constraint on perimeters can include three criteria—an enclosing perimeter criterion, an empty perimeter criterion, and a perimeter label criterion.

The enclosing perimeter criterion can require a connected component that encloses an area that contains another connected component. This criterion distinguishes perimeters from labels feature 320, because the labels are characters, none of which contain other connected components.

The empty perimeter criterion can distinguish an empty perimeter, not enclosing another perimeter or a label, from labels. Perimeter 328 is an empty perimeter, and is illustratively distinguished by having an outer closed curve and an inner closed curve, with less area between the closed curve than inside the inner closed curve. Perimeters that meet the empty perimeter criterion can be distinguished from the null set, conventionally represented by the label $\phi$. Other criteria could be applied to distinguish a null set label from an empty perimeter; for example, the null set label could by a connected component with four enclosed holes and the empty perimeter criterion could require three enclosed holes.

The perimeter label criterion can require a perimeter to have an outside nearest connected component that does not meet either of the other criteria, so that it must be a label. The nearest connected component must also be nearer to the perimeter than it is to other perimeters. This criterion is met by perimeter 322 and set label 330, by perimeter 324 and set label 332, by perimeter 326 and set label 334, and by perimeter 328 and set label 336.

The implementation described above can operate on a human-produced image showing a perimeter relationship representation with a perimeters feature that satisfies a constraint on perimeters. A machine could be implemented to produce a perimeters feature satisfying the same constraint automatically, in which case the implementation could be applied to a machine-produced image.

The implementation described above uses a tracing operation to distinguish perimeters within a perimeter feature. Perimeters could instead be distinguished by being drawn with different colors, or with different line widths or textures, such as dotted, dashed, solid, and so forth.

The implementation described above uses relationship data to produce an output image showing a table. The relationship data could instead be used to produce an output image showing a precisely formed version of a sketch in an input image, or to produce an output image showing some other type of graphical or textual representation of the relationship indicated by the relationship data.

The implementation described above handles labels as raster bitmaps, but could be extended to recognize labels using optical character recognition (OCR), and data indicating characters in the labels could be returned.

The implementation described above operates on binary images, but could be extended to operate on color or gray scale images, either directly or after binarization.

The implementation described above uses the results of image analysis to control rendering, but image analysis results could be used for a variety of other purposes. For example, the results of image analysis could be stored to preserve a graphical representation generated during a meeting using a tool such as a computer-controlled whiteboard device, for which user interface techniques are described in copending, coassigned U.S. patent application Ser. Nos. 07/869,554, now continued as application Ser. No. 08/394,919, entitled "Generalized Wiping as a User Interface for Object-Based Graphical Displays," and 07/869,559, now issued as U.S. Pat. No. 5,404,439, entitled "Time-Space Object Containment for Graphical User Interface," both incorporated herein by reference.

The rendering back end of the implementation described above is based on LaTex commands for producing tables. It could alternatively be based on a collection of PostScript code fragment templates, made interactively using, for example, the IDRAW program in the X window system. Examples of such code fragments include code to draw axes of an X-Y graph and code to draw a bar in a bar chart. Parameters of a graphical representation are automatically inserted into a PostScript code fragment template, and data defining an output image with a more precise version of the graphical representation is obtained by invoking a sequence of PostScript code fragments according to the structure of a category that applies to the graphical representation. This approach is compatible with many PostScript-based drawing/rendering programs. To make an interface to a new drawing system, one would simply perform interactive operations to obtain a collection of PostScript code fragment template files.

One of the advantages of the implementation described above is that the user can draw a relatively simple sketch to indicate a relatively complicated graphical representation that can be rendered automatically in response to the sketch. Therefore, the sketch cannot specify all the relevant parameters of the output image, making it necessary for parameters that are not specified to default sensibly. In the implementation described above, default parameters are supplied by rendering procedures. A user could instead provide defaults, such as in an initialization file. Defaults could be provided for specific categories and for specific rendering systems.

The implementation described above performs acts in a specific order that could instead be performed in another order. In FIG. 7, for example, the set labels could be handled in a different order than from the upper left.

The implementation described above obtains relationship data in the form of a list of sublists, where each sublist includes a set label and element labels within the set. Other types of relationship data can be obtained. For example, in response to a data image showing one or more element labels, relationship data could be obtained indicating set labels for perimeters that include at least one of the element labels shown; the element labels could be used to obtain the white regions that include them, and the segments that bound the white regions could then be used to obtain the perimeters. Also, in response to a data image showing one or more element labels, a data image could be obtained showing all connected components in the same white regions as the element labels shown. Or, in response to a data image showing one or more segments, a data image could be obtained showing element labels in perimeters that include the segments shown.

Figure 11:
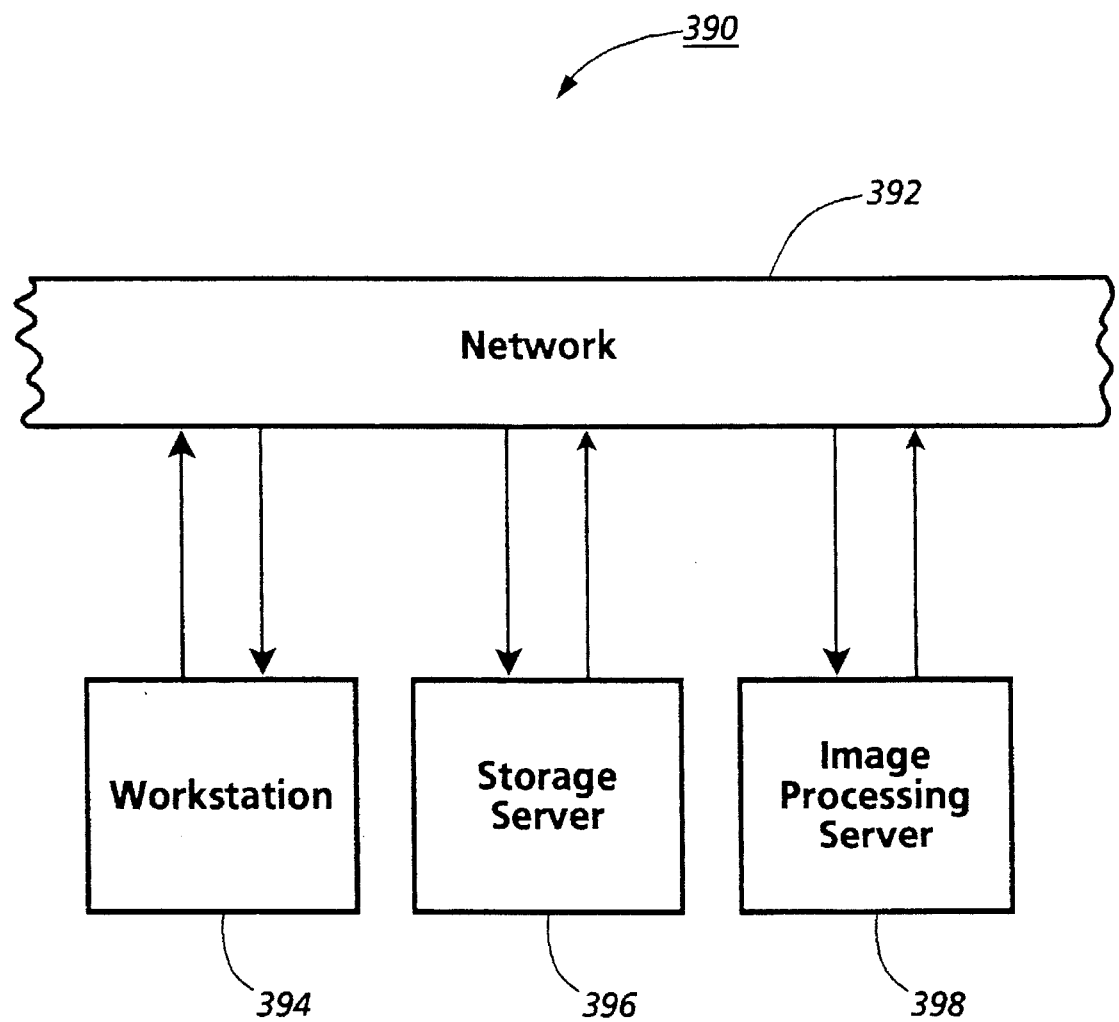
FIG. 11 is a schematic block diagram of an implementation with an image processing server.

The implementation described above in relation to FIG. 6 employs a workstation CPU that executes image processing instructions. FIG. 11 shows an alternative implementation that uses an image processing server. This implementation can provide the usual advantages of server architectures, including economy, speed, and sharing of resources.

System 390 in FIG. 11 includes network 392, workstation 394, storage server 396, and image processing server 398. A user can operate workstation 394 to provide requests on network 392 for storage of data defining images, such as from a scanner or other source. In response, storage server 396 can store the data. Then, the user can operate workstation 394 to provide requests for image processing operations like those described above. In response, image processing server 388 can perform the requested operations, executing instructions like those described above in relation to FIG. 6.

D. Application

Figure 12:
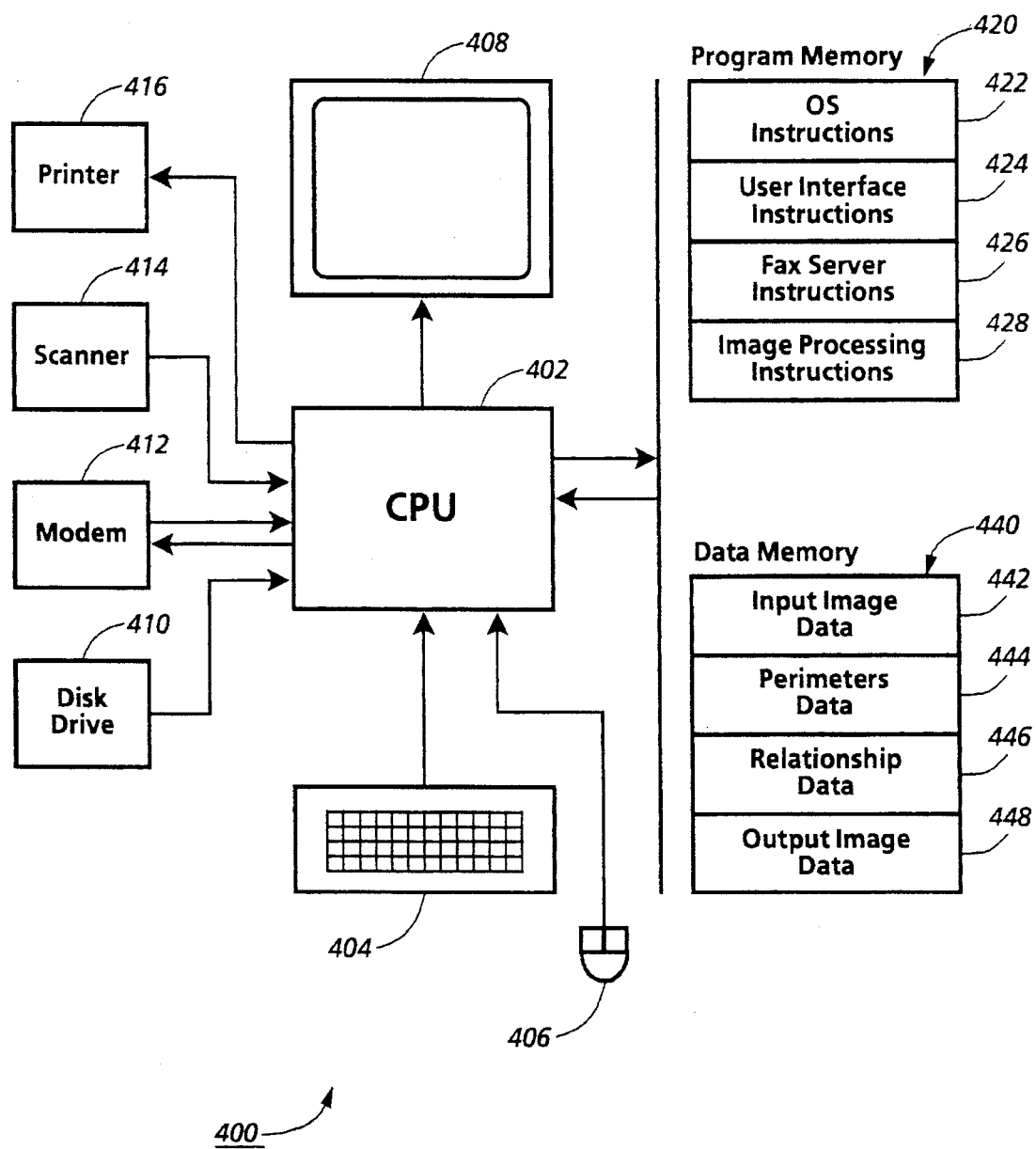
FIG. 12 is a schematic block diagram of a fax server application.
Figure 13:
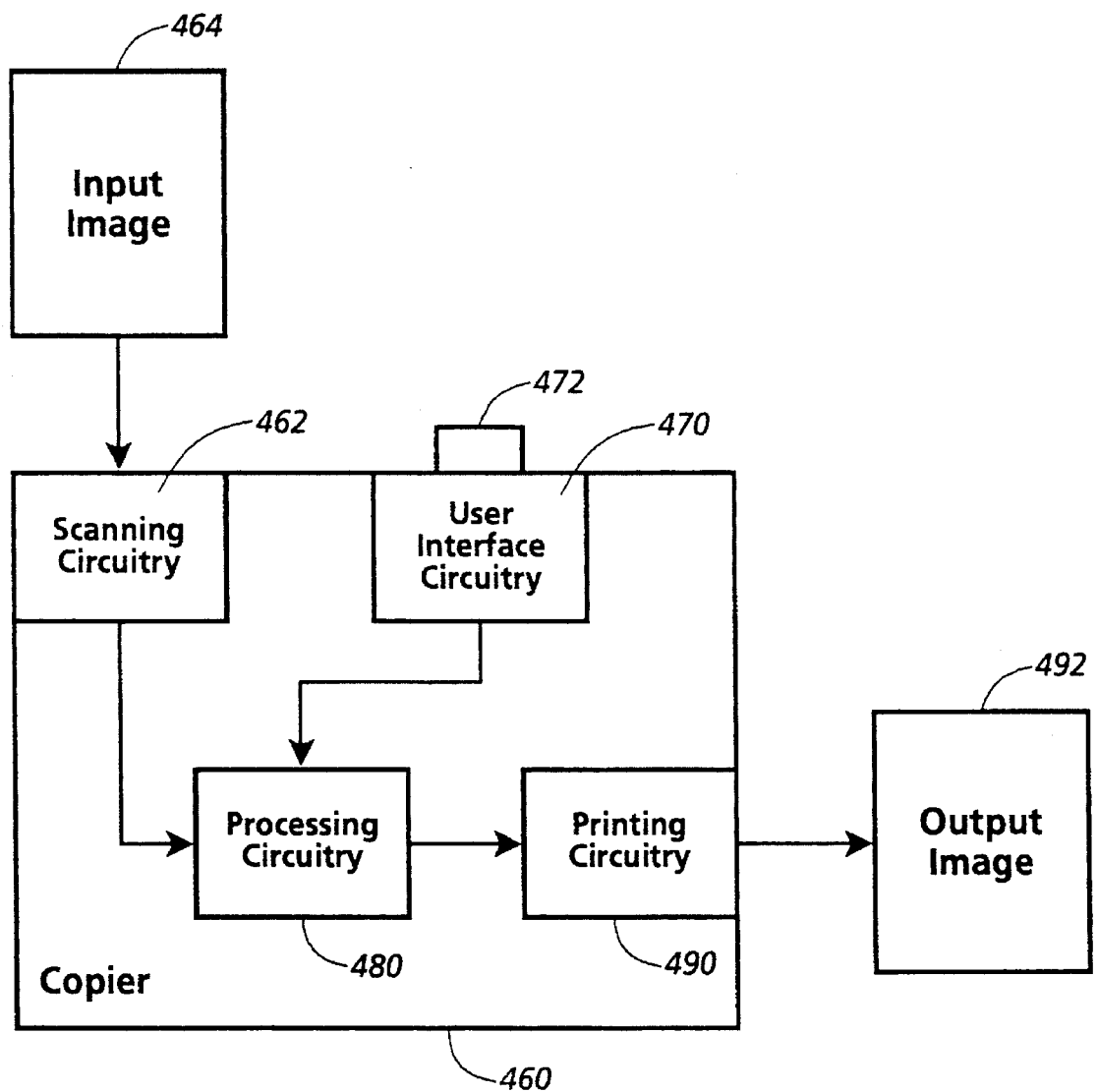
FIG. 13 is a schematic block diagram of a copier application.

The invention could be applied in many ways. FIG. 12 shows how the techniques described above could be applied in a personal computer that can operate as a fax server. FIG. 13 illustrates how the techniques described above could be applied in a copier.

System 400 in FIG. 10 includes CPU 402, which can be the CPU of a personal computer such as an IBM PC compatible machine. CPU 402 is connected to receive user input signals from keyboard 404 and mouse 406, and can present images to a user through display 408. CPU 402 is also connected to a number of other peripheral devices, illustratively including disk drive 410, modem 412, scanner 414, and printer 416.

Program memory 420 stores operating system (OS) instructions 422, which can be a version of DOS; user interface instructions 424; fax server instructions 426; and image processing instructions 428. Fax server instructions 426 can be similar to the PaperWorks™ software product described in copending, coassigned U.S. patent application Ser. No. 08/096,198, entitled "Data Access Based on Human-Produced Images," incorporated herein by reference. Image processing instructions 428 can be implemented as described above in relation to perimeter relationship instructions 204 in FIG. 6 and in relation to FIGS. 7–9. Fax server instructions 426 and image processing instructions 428 could be obtained in the form of a software product stored on a floppy disk, diskette, or CD-ROM, and accessed for storage in program memory 420 by disk drive 410.

Data memory 440 stores input image data 442, perimeters data 444, and relationship data 446 as described above in relation to FIGS. 6–8. Data memory 440 can also store output image data 448 if image processing instructions 428 obtain data defining an output image as described above in relation to FIG. 9.

System 400 can obtain input image data 442 defining an image that shows a perimeter relationship representation in many ways: Data defining an image showing a perimeter relationship representation could be produced interactively as described above in relation to FIG. 5, such as by executing user interface instructions 424. Any appropriate user interface techniques could be used, including pen-based techniques. Data defining a previously produced image showing a perimeter relationship representation could be retrieved from a storage medium by disk drive 410. Data defining an image showing a perimeter relationship representation could be obtained from scanner 414 as described above in relation to FIG. 4. A user could produce data defining an image showing a perimeter relationship representation elsewhere and provide it to system 400 through modem 412, such as by making a facsimile transmission to modem 412.

CPU 402 could execute fax server instructions 426 in response to a request received by facsimile transmission through modem 412. The request could include a form indicating an analysis operation and also indicating an output image destination such as a fax machine or printer 416. The request could also include data defining an image showing a perimeter relationship representation or could indicate an image previously obtained by system 400.

Fax server instructions 426 could include calls to image processing instructions 428 to perform acts like those shown in FIGS. 7 and 8 if the request indicates an analysis operation. Execution of fax server instructions 426 could further provide data defining an output image, which could be provided to modem 412 for facsimile transmission or to printer 416 for printing.

The implementations described above are especially well suited to offline sketch analysis as in FIG. 12 because speed of analysis matters less for offline analysis than it would for online analysis. Also, reliability may matter more for offline analysis than it would for online analysis. As illustrated in FIG. 13, however, the implementations described above may also be applied in online analysis, such as in a copier.

In FIG. 13, copier 460 can be a digital copier or other electronic reprographics system. Scanning circuitry 462 obtains data defining input image 464 showing a perimeter relationship representation. User interface circuitry 470 includes touch sensing device 472, which can be a push button, a heat or pressure sensitive element, a capacitance sensing element, or other device for sensing a touching action. When a user touches device 472, user interface circuitry 470 provides touch data indicating that device 472 has been touched.

Processing circuitry 480 uses the touch data to obtain request data indicating a request for an analysis operation. Then, responding to the request, processing circuitry 480 uses data defining input image 464 to automatically obtain perimeters data indicating a feature defining perimeters. Processing circuitry 480 then uses the perimeters data to obtain relationship data indicating a relationship among perimeters. Processing circuitry 480 then uses the relationship data to obtain data defining an output image that shows a table or other representation of the relationship.

This data is provided to printing circuitry 490 for printing of output image 492.

The invention could also be applied in combination with other techniques, including those described in copending, coassigned U.S. patent application Ser. No. 08/157,600, now issued as U.S. Pat. No. 5,455,898, entitled "Analyzing an Image Showing a Graphical Representation of a Layout" and Ser. No. 08/158,063, entitled "Using a Category to Analyze an Image Showing a Graphical Representation," all incorporated herein by reference.

E. Miscellaneous

The invention has been described in relation to implementations that analyze images showing sketches. The invention might also be implemented to analyze other types of images, by using appropriate criteria to obtain data indicating perimeters and to obtain data indicating a relationship among distinctions represented by the perimeters.

The invention has been described in relation to applications in which relationship data are used to obtain data defining an output image. The invention might also be implemented to store relationship data or to use relationship data for other purposes, such as to provide control signals.

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A machine-implemented method comprising:

obtaining input image data from image input circuitry; the input image data defining an input image that shows a perimeter relationship representation, the perimeter relationship representation including a perimeters feature that satisfies a constraint on perimeters; the perimeters feature enclosing areas of the input image in a way that indicates a relationship among distinctions;

using the input image data to obtain perimeters data indicating parts of the input image that satisfy the constraint on perimeters; the parts of the input image enclosing the areas of the input image enclosed by the perimeters feature; and using the perimeters data to obtain relationship data indicating the relationship among the distinctions.

2. The method of claim 1 in which the perimeters feature includes a label; the constraint on perimeters including a perimeter size criterion that requires a connected component that encloses one or more areas that together are greater than a certain multiple of the area of the connected component; the label not meeting the perimeter size criterion.

3. The method of claim 1 in which the perimeters feature includes an outer perimeter connected component enclosing a first area, an inner perimeter connected component, and a label; the constraint on perimeters including:

an enclosing perimeter criterion requiring a connected component that encloses an area containing another connected component; the inner perimeter connected component and the label being in the first area so that the outer perimeter connected component meets the enclosing perimeter criterion; and a perimeter label criterion requiring, for each perimeter, a nearest connected component outside the perimeter that does not meet the perimeter criterion and that is nearer to the perimeter than to any other perimeter; the inner perimeter connected component and the label satisfying the label relationship criterion.

4. The method of claim 3 in which the constraint on perimeters further includes an empty perimeter criterion that distinguishes empty perimeters from a labels; the inner perimeter connected component meeting the empty perimeter criterion.

5. A machine-implemented method comprising:

obtaining input image data from image input circuitry; the input image data defining an input image that shows a perimeter relationship representation, the perimeter relationship representation including a perimeters feature that satisfies a constraint on perimeters; the perimeters feature enclosing areas of the input image in a way that indicates a relationship among distinctions;

using the input image data to obtain perimeters data indicating parts of the input image that satisfy the constraint on perimeters; the parts of the input image enclosing the areas of the input image enclosed by the perimeters feature;

using the perimeters data to obtain relationship data indicating the relationship among the distinctions; and using the relationship data to obtain output image data defining an output image showing a graphical representation of the relationship among the distinctions.

6. The method of claim 5 in which the input image shows a sketch of the perimeter relationship representation; the graphical representation being a precisely formed version of the perimeter relationship representation.

7. The method of claim 5 in which the graphical representation is a table.

8. A method of operating a machine that includes:

image input circuitry for obtaining data defining images as input; and a processor connected for receiving data defining images from the image input circuitry;

the method comprising:

operating the processor to receive input image data from the image input circuitry, the input image data defining an input image that shows a perimeter relationship representation, the perimeter relationship representation including a perimeters feature that satisfies a constraint on perimeters; the perimeters feature enclosing areas of the input image in a way that indicates a relationship among distinctions;

operating the processor to use the input image data to obtain perimeters data indicating parts of the input image that satisfy the constraint on perimeters; the parts of the input image enclosing the areas of the input image enclosed by the perimeters feature; and operating the processor to use the perimeters data to obtain relationship data indicating the relationship among the distinctions.

9. The method of claim 8 in which the machine further comprises image output circuitry for providing data defining images as output;the method further comprising:

using the relationship data to obtain output image data defining an output image that shows a graphical representation of the relationship among the distinctions; and providing the output image data to the image output circuitry.

10. A machine comprising:

image input circuitry for obtaining data defining images as input;

memory for storing data; and a processor connected for receiving data defining images from the image input circuitry and connected for accessing data stored in the memory;

the data stored in the memory comprising instruction data indicating image processing instructions the processor can execute; the processor, in executing the image processing instructions:

receiving input image data from the image input circuitry, the input image data defining an input image that shows a perimeter relationship representation; the perimeter relationship representation including a perimeters feature that satisfies a constraint on perimeters; the perimeters feature enclosing areas of the input image in a way that indicates a relationship among distinctions;

using the input image data to obtain perimeters data indicating parts of the input image that satisfy the constraint on perimeters; the parts of the input image enclosing the areas of the input image enclosed by the perimeters feature; and using the perimeters data to obtain relationship data indicating the relationship among the distinctions.

11. The machine of claim 10 in which the input image circuitry is connected for receiving facsimile transmissions.

12. The machine of claim 10 in which the machine further comprises image output circuitry for providing data defining images as output; the processor further, in executing the image processing instructions:

using the relationship data to obtain output image data defining an output image that shows a graphical representation of the relationship among the perimeters; and providing the output image data to the image output circuitry.

13. The machine of claim 12 in which the output image circuitry is connected for providing facsimile transmissions.

14. The machine of claim 10 in which the machine is an image processing server; the image processing server being connected to a network for receiving requests for image processing operations; the network including the image input circuitry; the instruction data further indicating request handling instructions the processor can execute; the processor, in executing the request handling instructions, determining whether to execute the image processing instructions.

15. The machine of claim 10 in which the machine is a fax server.

16. The machine of claim 10 in which the machine is a copier.

17. An article of manufacture for use in a machine that includes:

image input circuitry for obtaining data defining images as input;

a storage medium access device for accessing a medium that stores data; and a processor connected for receiving data defining images from the image input circuitry; the processor further being connected for receiving data from the storage medium access device;

the article comprising:

a storage medium that can be accessed by the storage medium access device when the article is used in the system; and data stored by the storage medium so that the storage medium access device can provide the stored data to the processor when the article is used in the system; the stored data comprising instruction data indicating instructions the processor can execute; the processor, in executing the instructions:

receiving input image data from the image input circuitry, the input image data defining an input image that shows a perimeter relationship representation; the perimeter relationship representation including a perimeters feature that satisfies a constraint on perimeters; the perimeters feature enclosing areas of the input image in a way that indicates a relationship among distinctions;

using the input image data to obtain perimeters data indicating parts of the input image that satisfy the constraint on perimeters; the parts of the input image enclosing the areas of the input image enclosed by the perimeters feature; and using the perimeters data to obtain relationship data indicating the relationship among the distinctions.

18. A machine-implemented method comprising:

obtaining input image data from image input circuitry; the input image data defining an input image that shows a perimeter relationship representation, the perimeter relationship representation including a perimeters feature that satisfies a constraint on perimeters; the perimeters feature enclosing areas of the input image in a way that indicates a relationship among distinctions;

automatically performing image analysis using the input image data to obtain perimeters data indicating parts of the input image that satisfy the constraint on perimeters; the parts of the input image enclosing the areas of the input image enclosed by the perimeters feature; and using the perimeters data to obtain relationship data indicating the relationship among the distinctions.

19. The method of claim 18 in which the perimeter relationship representation is a Venn diagram.

20. The method of claim 19 in which the relationship data include a list of sublists, each sublist including a set identifier identifying a set of items and a list of element identifiers identifying elements within the set.

21. The method of claim 20 in which the input image shows a perimeter label; the set identifiers including the perimeter label shown by the input image.

22. The method of claim 20 in which the input image shows an item label; the item identifiers including the item label shown by the input image.

* * * * *